(12) United States Patent
Uesugi et al.

(10) Patent No.: US 11,326,475 B2
(45) Date of Patent: May 10, 2022

(54) TURBOCHARGER

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Tsuyoshi Uesugi, Kariya (JP); Takashi Tsukiyama, Toyota (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/287,042

(22) PCT Filed: Oct. 25, 2019

(86) PCT No.: PCT/JP2019/041884
§ 371 (c)(1),
(2) Date: Apr. 20, 2021

(87) PCT Pub. No.: WO2020/095716
PCT Pub. Date: May 14, 2020

(65) Prior Publication Data
US 2021/0381471 A1 Dec. 9, 2021

(30) Foreign Application Priority Data
Nov. 5, 2018 (JP) .............................. JP2018-208085

(51) Int. Cl.
*F01D 25/24* (2006.01)
*F02C 6/12* (2006.01)
*F04D 17/02* (2006.01)

(52) U.S. Cl.
CPC ........... *F01D 25/243* (2013.01); *F01D 25/24* (2013.01); *F01D 25/246* (2013.01); *F02C 6/12* (2013.01);
(Continued)

(58) Field of Classification Search
CPC ...... F01D 25/243; F01D 25/24; F01D 25/246; F02C 6/12; F04D 17/025; F05D 2220/40; F05D 2240/12
See application file for complete search history.

(56) References Cited

U.S. PATENT DOCUMENTS 7,509,804 B2 * 3/2009 Kobayashi ............ F01D 25/162
60/602
7,797,936 B2 * 9/2010 Hayashi .................. F01D 25/24
60/602
(Continued)

FOREIGN PATENT DOCUMENTS

JP 2010-053774 A 3/2010
JP 2010-203239 A 9/2010

OTHER PUBLICATIONS

International Search Report for PCT/JP2019/041884 dated Dec. 17, 2019 (Form PCT/ISA/210).

*Primary Examiner* — Michael Lebentritt
*Assistant Examiner* — Brian Christopher Delrue
(74) *Attorney, Agent, or Firm* — Sughrue Mion, PLLC

(57) ABSTRACT

A turbocharger includes a compressor housing, a turbine housing, a bearing housing, a variable nozzle unit, and a fixing member. The variable nozzle unit includes a first plate, a second plate, a plurality of nozzle vanes, and an attitude changing mechanism. The fixing member includes an engagement portion that is engaged with at least one of the first plate and the second plate, a through shaft portion shaped to extend through the bearing housing toward the compressor housing, and a fixing portion that fixes an end
(Continued)

portion of the through shaft portion on the compressor housing side to the hearing housing.

6 Claims, 5 Drawing Sheets

(52) U.S. Cl.
CPC ........ *F04D 17/025* (2013.01); *F05D 2220/40* (2013.01); *F05D 2240/12* (2013.01)

(56) References Cited

U.S. PATENT DOCUMENTS

| | | | |
|---|---|---|---|
| 10,641,125 B2* | 5/2020 | Asakawa | F02B 37/24 |
| 10,907,496 B2* | 2/2021 | Shioya | F01D 17/165 |
| 10,975,886 B2* | 4/2021 | Asakawa | F04D 17/10 |
| 2018/0238190 A1* | 8/2018 | Ikeda | F01D 17/165 |
| 2020/0182257 A1* | 6/2020 | Uemura | F04D 29/403 |

* cited by examiner

TURBOCHARGER

CROSS REFERENCE TO RELATED APPLICATIONS

This is a National Stage of International Application No. PCT/JP2019/041884 filed Oct. 25, 2019, claiming priority based on Japanese Patent Application No. 2018-208085 filed Nov. 5, 2018.

TECHNICAL FIELD

The present disclosure relates to a turbocharger.

BACKGROUND ART

Conventionally, a turbocharger is known that includes a variable nozzle unit which is provided in a turbine housing and which is capable of varying a flow path area of exhaust gas flowing into a turbine wheel to thereby adjust a velocity of the exhaust gas. Japanese Patent Laying-Open No. 2010-53774 (referred to as "PTL 1" hereinafter), for example, discloses a turbocharger including a compressor housing, a turbine housing, a bearing housing (center housing), a variable nozzle unit (shroud mechanism), pin members, and nuts.

The compressor housing houses a compressor wheel, and the turbine housing houses a turbine wheel. The bearing housing is provided between the compressor housing and the turbine housing. The bearing housing houses a rotation shaft that connects the compressor wheel to the turbine wheel, and a hearing that receives this rotation shaft.

The variable nozzle unit is disposed in the turbine housing, and is capable of adjusting the size of a flow path area of an exhaust gas flow path. Specifically, the variable nozzle unit includes first and second annular plates disposed to face each other, a plurality of variable nozzle vanes disposed between the plates for varying the size of the flow path area of the exhaust gas flow path, and a mechanism for changing an attitude of each variable nozzle vane.

The pin members and the nuts are members for fixing the variable nozzle unit in the turbine housing. The pin member is connected to each plate, and is shaped to extend from the inside of the turbine housing to the outside of the turbine housing. Each pin member is provided with an external thread on its outer end portion opposite to the side connected to the plates. The nut is attached to the outer end portion of the pin member. The variable nozzle unit is fixed in the turbine housing in this manner.

CITATION LIST

Patent Literature

PTL 1: Japanese Patent Laying-Open No. 2010-53774

SUMMARY

Technical Problem

In the turbocharger such as described in PTL 1, each plate of the variable nozzle unit disposed in the turbine housing comes into contact with high-temperature exhaust gas, and is therefore going to thermally expand outward in the radial direction of the plate. However, since the first plate is fixed to the turbine housing by the pin members, the thermal expansion of the first plate is constrained by the pin members. As a result, a part of the first plate that is located radially inward with respect to the portion coupled to the pin members may deform by bulging toward the second plate. When such deformation occurs, the first plate may interfere with and cause a malfunction of the nozzle vanes.

An object of the present disclosure is to provide a turbocharger capable of suppressing interference between a plate and nozzle vanes of a variable nozzle unit.

Solution to Problem

A turbocharger according to the present disclosure includes: a compressor housing that houses a compressor impeller; a turbine housing that: houses a turbine wheel; a bearing housing between the compressor housing and the turbine housing, that houses a shaft coupling the compressor impeller to the turbine wheel, and a bearing receiving the shaft; a variable nozzle unit disposed in the turbine housing and capable of adjusting a size of a flow path area of an exhaust gas flow path; and a fixing member that fixes the variable nozzle unit in the turbine housing. The variable nozzle unit includes a first plate formed in an annular shape, a second plate formed in an annular shape and disposed at a position closer to the bearing housing than the first plate and facing the first plate, the second plate forming the exhaust gas flow path between the first plate and the second plate, a plurality of nozzle vanes disposed between the first plate and the second plate, that varies the size of the flow path area of the exhaust gas flow path, and an attitude changing mechanism that changes an attitude of each of the plurality of nozzle vanes. The fixing member includes an engagement portion that is engaged with at least one of the first plate and the second plate, a through shaft portion connected to the engagement portion and shaped to extend through the bearing housing toward the compressor housing, and a fixing portion that fixes an end portion of the through shaft portion on the compressor housing side to the bearing housing.

Advantageous Effects

According to the present disclosure, a turbocharger capable of suppressing interference between a plate and nozzle vanes of a variable nozzle unit can be provided.

DESCRIPTION OF EMBODIMENTS

Figure 1:
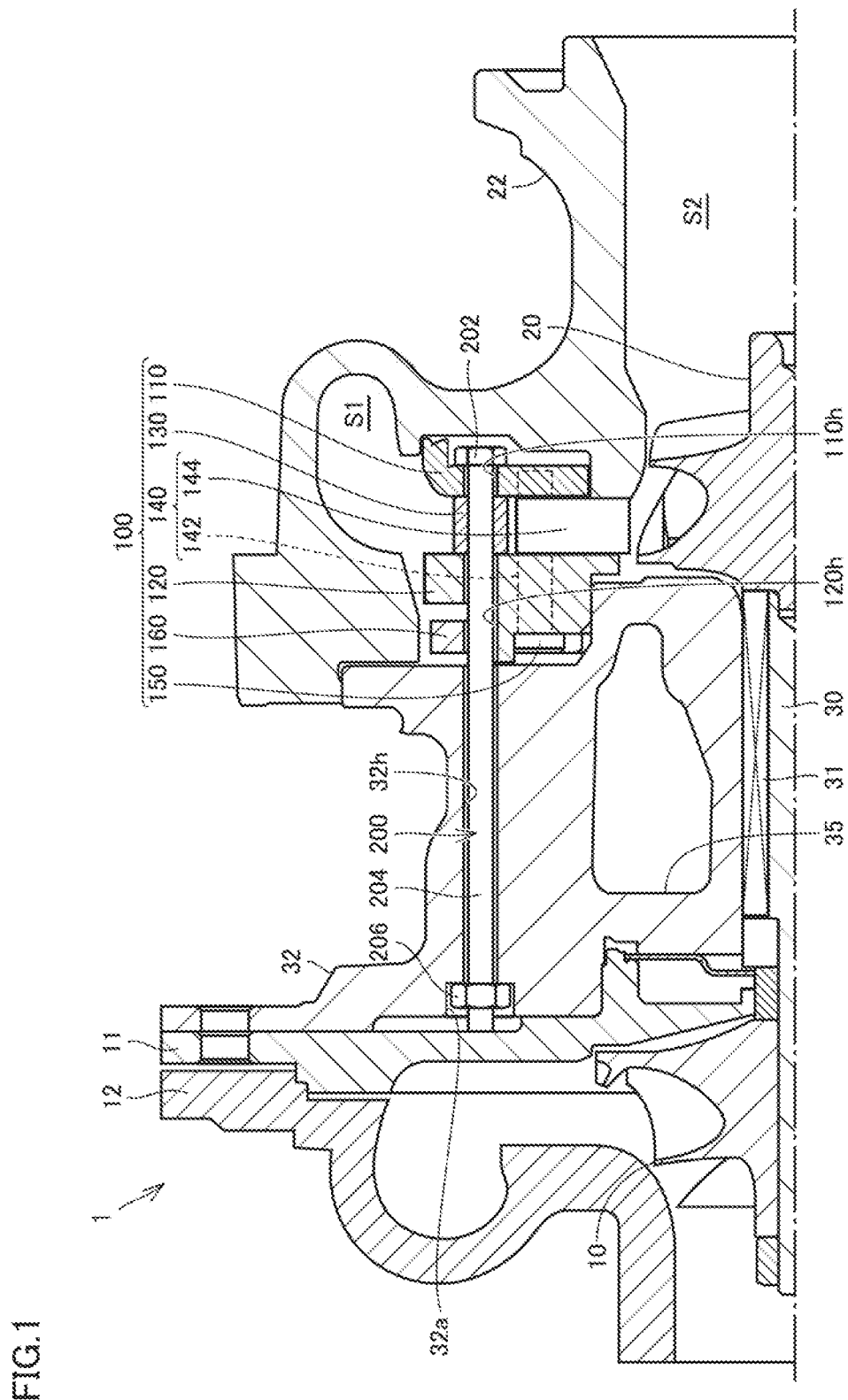
FIG. 1 is a cross-sectional view schematically showing a turbocharger in one embodiment of the present disclosure.

An embodiment of the present disclosure will be described with reference to the drawings. Note that the same or corresponding members are designated by the same numbers in the drawings referred to below.

Figure 2:
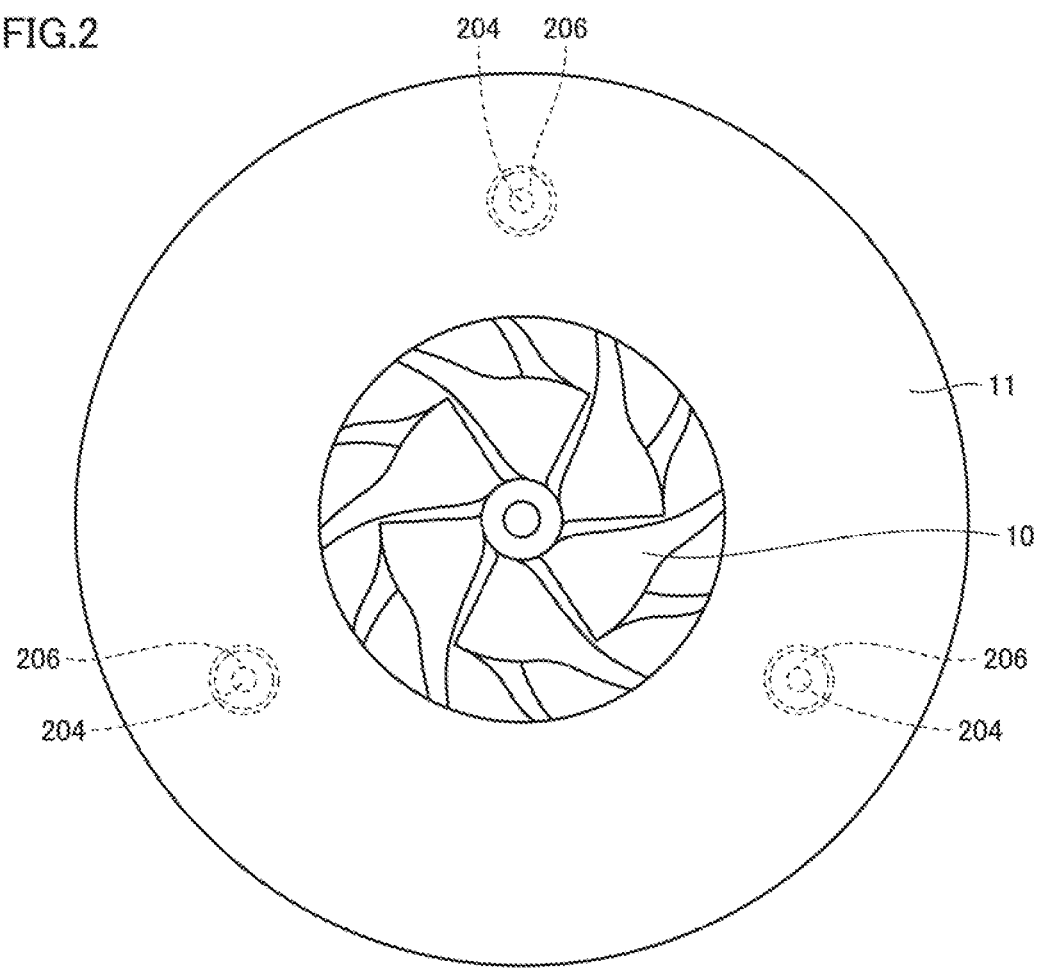
FIG. 2 shows the turbocharger in FIG. 1 as seen from a compressor impeller side.

FIG. 1 is a cross-sectional view schematically showing a turbocharger in one embodiment of the present disclosure. FIG. 2 shows the turbocharger in FIG. 1 as seen from a compressor impeller side.

As shown in FIGS. 1 and 2, a turbocharger 1 includes a compressor impeller 10, a seal plate 11, a compressor housing 12, a turbine wheel 20, a turbine housing 22, a shaft 30, a bearing 31, a bearing housing 32, a variable nozzle unit 100, and a fixing member 200. This turbocharger 1 is provided on an engine (not shown) mounted on a vehicle such as an automobile. Note that FIG. 2 shows the turbocharger after the compressor housing 12 has been removed.

Exhaust gas discharged from the engine flows into the turbine housing 22. The turbine housing 22 includes a scroll chamber S1 surrounding the circumference of the turbine wheel 20, and a tubular discharge passage S2 provided downstream of the turbine wheel 20 in the flow of the exhaust gas. The exhaust gas discharged from the engine is introduced into the discharge passage S2 through the scroll chamber S1.

The turbine wheel 20 is housed in the turbine housing 22, and rotates by receiving energy of the exhaust gas. After its energy has been recovered by the turbine wheel, the exhaust gas is discharged through the discharge passage S2 to an exhaust passage of the engine provided with an exhaust purification catalyst or an exhaust purifier such as a DPF.

The shaft 30 has one end coupled to the turbine wheel 20. The bearing 31 rotatably supports the shaft 30.

The bearing housing 32 houses the bearing 31, and is mounted to the turbine housing 22, The bearing housing 32 is provided with a coolant path 35 through which coolant flows. The bearing housing 32 has the seal plate 11 attached to its end portion opposite to the end portion mounted to the turbine housing 22. The shaft 30 is pivotably supported by the bearing housing 32 and the seal plate 11.

The compressor impeller 10 is coupled to the other end of the shaft 30. Thus, a rotational driving force of the turbine wheel 20 is transmitted to the compressor impeller 10. The compressor impeller 10 is housed in the compressor housing 12. The compressor housing 12 is mounted to the seal plate 11 and the bearing housing 32. Intake gas such as air compressed by rotation of the compressor impeller 10 is supplied to the engine.

The variable nozzle unit 100 is disposed in the turbine housing 22. More specifically, the variable nozzle unit 100 is disposed between the scroll chamber S1 and the turbine wheel 20. The variable nozzle unit 100 is capable of adjusting the size of a flow path area of an exhaust gas flow path. In other words, the exhaust gas that has flowed into the turbine housing 22 is adjusted in velocity by the variable nozzle unit 100, and supplied to the turbine wheel 20. The variable nozzle unit 100 includes a first plate 110, a second plate 120, a plurality of spacers 130, a plurality of nozzle vanes 140, a plurality of vane arms 150, and a unison ring 160.

The first plate 110 is formed in an annular shape. The first plate 110 is disposed in the turbine housing 22 in such an attitude that its center coincides with a central axis of the shall 30.

The second plate 120 is formed in an annular shape. The second plate 120 is disposed at a position closer to the hearing housing 32 than the first plate 110 and facing the first plate 110. The second plate 120 is disposed in the turbine housing 22 in such an attitude that its center coincides with the central axis of the shaft 30. The second plate 120 forms the exhaust gas flow path between the first plate 110 and the second plate 120.

Each spacer 130 is disposed between the first plate 110 and the second plate 120. Each spacer 130 is a member that defines the distance between the first plate 110 and the second plate 120. Each spacer 130 is formed in a cylindrical shape.

Each nozzle vane 140 varies the size of the flow path area of the exhaust gas flow path by rotating around an axis parallel to a direction in which the first plate 110 and the second plate 120 lace each other. Each nozzle vane 140 includes a rotation shaft portion 142 and a vane 144.

The rotation shaft portion 142 is held to the first plate 110 and the second plate 120 so as to be rotatable relative to the first plate 110 and the second plate 120. The rotation shaft portion 142 is held to the first plate 110 and the second plate 120 in such an attitude that its central axis is parallel to the direction in which the first plate 110 and the second plate 120 face each other.

The vane 144 is disposed between the first plate 110 and the second plate 120. The vane 144 is fixed to the rotation shaft portion 142 so as to rotate around the central axis of the rotation shaft portion 142 together with the rotation shaft portion 142.

Each vane arm 150 is connected (e.g., welded) to a part of each rotation shaft portion 142 that protrudes from the second plate 120 along a direction from the first plate 110 toward the second plate 120, Each vane arm 150 causes each rotation shaft portion 142 to rotate around its central axis.

The unison ring 160 is a member that causes all vane arms 150 to simultaneously rotate around each rotation shaft portion 142. The unison ring 160 is supported to the second plate 120 so as to be rotatable around a central axis of the second plate 120 relative to the second plate 120. Each vane arm 150 is engaged with the unison ring 160. Thus, the rotation of the unison ring 160 relative to the second plate 120 causes each vane arm 150 to rotate around each rotation shaft portion 142. The attitude of each vane 144 is thereby changed, resulting in variation in the size of the flow path area of the exhaust gas flow path. That is, each vane arm 150 and the unison ring 160 form an "attitude changing mechanism" that changes the attitude of each nozzle vane 140.

The fixing member 200 is a member that fixes the variable nozzle unit 100 in the turbine housing 22. As shown in FIG. 2, the turbocharger 1 in the present embodiment includes three fixing members 200. These fixing members 200 are arranged at 120 degree intervals around the central axis of the shaft 30. However, the number and the arrangement of the fixing members 200 are not limited to those in this example. Each fixing member 200 includes an engagement portion 202, a through shaft portion 204, and a fixing portion 206.

The engagement portion 202 is a part that is engaged with at least one of the first plate 110 and the second plate 120 in the present embodiment, the engagement portion 202 is engaged with the first plate 110. Specifically, the engagement portion 202 is engaged with the first plate 110 from outside of the first plate 110 in the direction in which the first plate 110 and the second plate 120 are aligned with each other. The engagement portion 202 is formed of a head of a bolt.

The through shaft portion 204 is connected to the engagement portion 202. The through shaft portion 204 is shaped to extend through the bearing housing 32 toward the compressor housing 12. Specifically, the bearing housing 32 is provided with an insertion hole 32h through which to insert the through shaft portion 204, and the through shaft portion 204 is inserted in the insertion hole 32h. The through shaft portion 204 is formed of a shaft of a bolt. The through shaft portion 204 is provided with an external thread portion on its end portion on the compressor housing 12 side. The first plate 110 is provided with a first insertion hole 110*h* through which to insert the through shaft portion 204. The engagement portion 202 is shaped larger than the first insertion hole 110*h*. The second plate 120 is provided with a second insertion hole 120*h* through which to insert the through shaft portion 204. The through shaft portion 204 is inserted in the first insertion hole 110*h* and the second insertion hole 120*h*. The through shaft portion 204 is press-fit into the second insertion hole 120*h*. Stated another way, the second insertion hole 120*h* is set to be slightly smaller in diameter than the through shaft portion 204. The through shaft portion 204 is inserted in the spacer 130.

The fixing portion 206 is a part that fixes an end portion of the through shaft portion 204 on the compressor housing 12 side to the bearing housing 32. The fixing portion 206 is formed of a nut that is screwed on the above-described external thread portion.

The bearing housing 32 has a recess 32*a* that receives the fixing portion 206. The compressor housing 12 is connected to the bearing housing 32 so as to cover the recess 32*a*.

As described above in the turbocharger 1 of the present embodiment, the through shaft portion 204 extends through the hearing housing 32, to ensure a large distance from the fixing portion 206 to the engagement portion 202, thereby also ensuring a distance over which the engagement portion 202 can be displaced outward in the radial direction of the plates 110 and 120 relative to the fixing portion 206. Thus, a reaction force received by the plates 110 and 120 from the fixing member 200 during thermal expansion of the plates 110 and 120 is reduced, or, stated another way, a constraint of the thermal expansion of the plates by the fixing member 200 is relaxed. Therefore, the deformation of each of the plates 110 and 120 and the resulting interference between the plate and the nozzle vanes 140 is suppressed.

In addition, in the present embodiment, the through shaft portion 204 is inserted in the second insertion hole 120*h*, and the engagement portion 202 is engaged with the first plate 110. Accordingly, the first plate 110 and the second plate 120 are held by the fixing member 200. Thus, the need for a member dedicated to connecting the first plate 110 and the second plate 120 to each other can be eliminated.

Further, since the through shaft portion 204 is press-fit into the second insertion hole 120*h*, the variable nozzle unit 100 including the first plate 110 and the second plate 120 is integrated by the fixing member 200. Accordingly, the handling of the variable nozzle unit 100 is facilitated.

Figure 3:
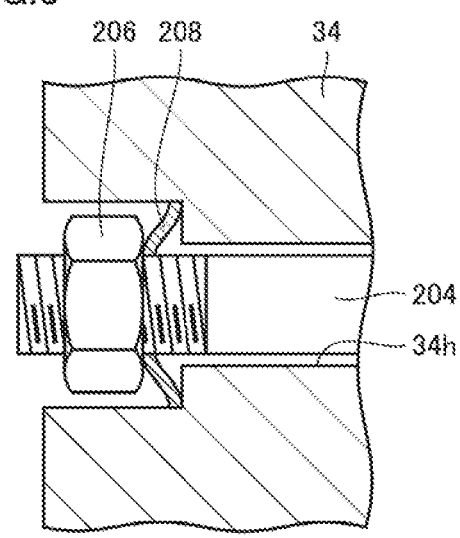
FIG. 3 shows a variation of a fixing member.

As shown in FIG. 3, the fixing member 200 may further include an elastic member 208, such as a washer, disposed between the bearing housing 32 and the fixing portion 206. In this example, adjustment of an apparent spring constant of the through shaft portion 204 and the elastic member 208 as a whole is facilitated.

Figure 4:
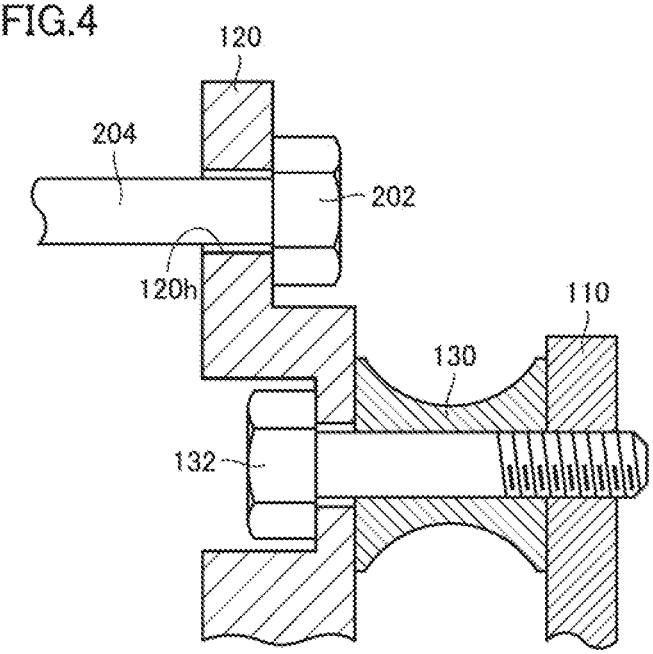
FIG. 4 shows a variation of a manner of engagement of an engagement portion with a variable nozzle unit.

As shown in FIG. 4, the through shaft portion 204 may be inserted only in the second plate 120, and the engagement portion 202 may be engaged with the second plate 120. In this case, the first plate 110 and the second plate 120 are preferably fastened to each other with a fastening member 132 such as a bolt. This example also provides effects similar to those of the above-described embodiment.

Figure 5:
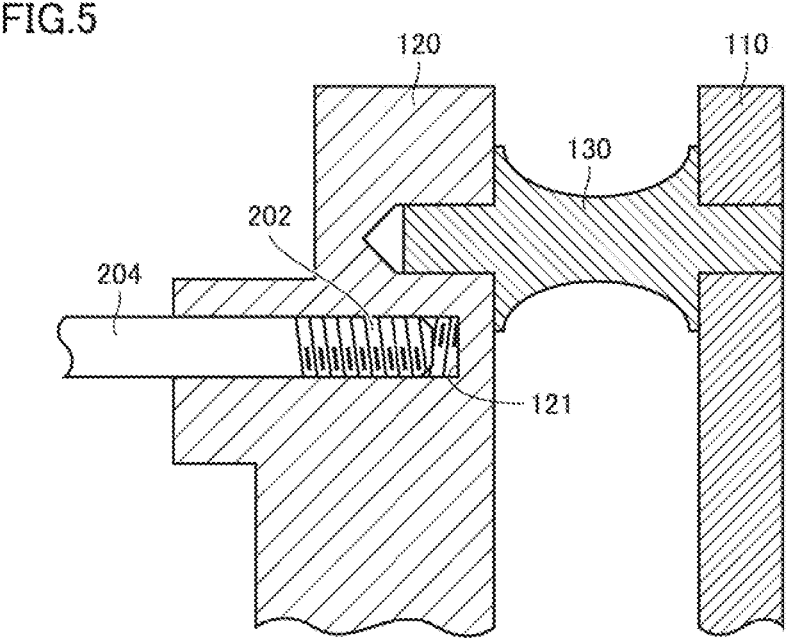
FIG. 5 shows a variation of a manner of engagement of the engagement portion with the variable nozzle unit.

The engagement portion 202 is not limited to the configuration of the above-described embodiment (a head of a bolt) as long as it prevents pull-out of the through shaft portion 204 from the first plate 110 or the second plate 120 in the direction from the first plate 110 toward the second plate 120. For example, as with the configuration of the fixing portion 206, the through shaft portion 204 may be provided with an external thread portion on its end portion on the turbine housing 22 side, and the engagement portion 202 may be formed of a nut that is screwed on that external thread portion. Alternatively, the engagement portion 202 may be formed in such a shape that gradually increases in diameter as the distance from the through shaft portion 204 increases, and the first insertion hole 110*h* in the first plate 110 or the second insertion hole 120*h* in the second plate 120 may be formed in a tapered shape that corresponds to an outer circumferential surface of the engagement portion 202. As shown in FIG. 5, the engagement portion 202 may be formed as an external thread portion that is screwed on an internal thread portion 121 provided on the second plate 120. In this case, the first insertion hole 110*h* and the second insertion hole 120*h* are not provided. The spacers 130 may be formed to be solid.

Alternatively, although not shown, the through shaft portion 204 may extend through the second plate 120, and the engagement portion 202 formed as an external thread portion may be screwed on an internal thread portion provided on the first plate 110.

The through shaft portion 204 may include a first shaft portion disposed in the turbine housing 22, and a second shaft portion disposed in the hearing housing 32, and the second shaft portion may include a small-diameter portion having a diameter smaller than that of the first shaft portion. In this example, when the through shaft portion 204 varies in temperature, the small-diameter portion of the second shaft portion mainly expands and contracts, and therefore, expansion and contraction of the first shaft portion is suppressed. Thus, breakage of the first shaft portion subjected to a higher temperature than the second shaft portion is suppressed.

The above-described embodiment is now summarized.

A turbocharger in the above-described embodiment includes: a compressor housing that houses a compressor impeller; a turbine housing that houses a turbine wheel; a bearing housing between the compressor housing and the turbine housing, that houses a shaft coupling the compressor impeller to the turbine wheel, and a bearing receiving the shaft; a variable nozzle unit disposed in the turbine housing and capable of adjusting a size of a flow path area of an exhaust gas flow path; and a fixing member, that fixes the variable nozzle unit in the turbine housing. The variable nozzle unit includes a first plate formed in an annular shape, a second plate formed in an annular shape and disposed at a position closer to the bearing housing than the first plate and facing the first plate, the second plate forming the exhaust gas flow path between the first plate and the second plate, a plurality of nozzle vanes disposed between the first plate and the second plate, that varies the size of the flow path area of the exhaust gas flow path, and an attitude changing mechanism that changes an attitude of each of the plurality of nozzle vanes. The fixing member includes an engagement portion that is engaged with at least one of the first plate and the second plate, a through shaft portion connected to the engagement portion and shaped to extend through the bearing housing toward the compressor housing, and a fixing portion that fixes an end portion of the through shaft portion on the compressor housing side to the bearing housing.

In this turbocharger, the through shaft portion extends through the hearing housing, to ensure a large distance from the fixing portion to the engagement portion, thereby also ensuring a distance over which the engagement portion can be displaced outward in the radial direction of the plates relative to the fixing portion. Thus, a reaction force received by the plates from the fixing member during thermal expansion of the plates is reduced, or, stated another way, a constraint of the thermal expansion of the plates by the fixing member is relaxed. Therefore, the deformation of each of the plates and the resulting interference between the plate and the nozzle vanes is suppressed.

Preferably, the second plate is provided with a second insertion hole through which to insert the through shaft portion, the through shaft portion is inserted in the second insertion hole, and the engagement portion is engaged with the first plate.

Thus, the first plate and the second plate are held, by the fixing member. Accordingly, the need for a member dedicated to connecting the first plate and the second plate to each other can be eliminated.

Moreover, preferably, the through shaft portion is press-fit into the second insertion hole.

Thus, the variable nozzle unit including the first plate and the second plate is integrated by the fixing member. Accordingly, the handling of the variable nozzle unit is facilitated.

Preferably, the through shaft portion includes a first shaft portion disposed in the turbine housing, and a second shaft portion disposed in the bearing housing, and the second shaft portion includes a small-diameter portion having a diameter smaller than that of the first shaft portion.

Thus, when the through shaft portion varies in temperature, the small-diameter portion of the second shaft portion mainly expands and contracts, and therefore, expansion and contraction of the first shaft portion is suppressed. Thus, breakage of the first shaft portion subjected to a higher temperature than the second shaft portion is suppressed.

It should be understood that the embodiment disclosed herein is illustrative and non-restrictive in every respect. The scope of the present disclosure is defined by the terms of the claims, rather than the description of the embodiment above, and is intended to include any modifications within the scope and meaning equivalent to the terms of the claims.

REFERENCE SIGNS LIST 1 turbocharger; 10 compressor impeller; 11 seal plate; 12 compressor housing; 20 turbine wheel; 22 turbine housing; 30 shaft; 31 bearing; 32 bearing housing; 32*a* recess; 32*h* insertion hole; 100 variable nozzle unit; 110 first plate; 110*h* first insertion hole; 120 second plate; 120*h* second insertion hole; 130 spacer; 140 nozzle vane; 142 rotation shaft portion; 144 vane; 150 vane arm; 160 unison ring; 200 fixing member; 202 engagement portion; 204 through shaft portion; 206 fixing portion.

The invention claimed is:

1. A turbocharger comprising:
a compressor housing that houses a compressor impeller;
a turbine housing that houses a turbine wheel;
a bearing housing between the compressor housing and the turbine housing, that houses a shaft coupling the compressor impeller to the turbine wheel, and a bearing receiving the shaft;
a variable nozzle unit disposed in the turbine housing and capable of adjusting a size of a flow path area of an exhaust gas flow path; and
a fixing member that fixes the variable nozzle unit in the turbine housing,
the variable nozzle unit including
a first plate formed in an annular shape,
a second plate formed in an annular shape and disposed at a position closer to the bearing housing than the first plate and facing the first plate, the second plate forming the exhaust gas flow path between the first plate and the second plate,
a plurality of nozzle vanes disposed between the first plate and the second plate, that varies the size of the flow path area of the exhaust gas flow path, and
an attitude changing mechanism that changes an attitude of each of the plurality of nozzle vanes, and
the fixing member including
an engagement portion that is engaged with at least one of the first plate and the second plate,
a through shaft portion connected to the engagement portion and shaped to extend through the bearing housing toward the compressor housing, and
a fixing portion that fixes an end portion of the through shaft portion on the compressor housing side to the bearing housing.

2. The turbocharger according to claim 1, wherein
the second plate is provided with a second insertion hole through which to insert the through shaft portion,
the through shaft portion is inserted in the second insertion hole, and
the engagement portion is engaged with the first plate.

3. The turbocharger according to claim 2, wherein
the through shaft portion is press-fit into the second insertion hole.

4. The turbocharger according to claim 1, wherein
the through shaft portion includes a first shaft portion disposed in the turbine housing, and a second shaft portion disposed in the bearing housing, and
the second shaft portion includes a small-diameter portion having a diameter smaller than that of the first shaft portion.

5. The turbocharger according to claim 2, wherein
the through shaft portion includes a first shaft portion disposed in the turbine housing, and a second shaft portion disposed in the bearing housing, and
the second shaft portion includes a small-diameter portion having a diameter smaller than that of the first shaft portion.

6. The turbocharger according to claim 3, wherein
the through shaft portion includes a first shaft portion disposed in the turbine housing, and a second shaft portion disposed in the bearing housing, and
the second shaft portion includes a small-diameter portion having a diameter smaller than that of the first shaft portion.

* * * * *